United States Patent
Bedingfield, Sr. et al.

(10) Patent No.: US 7,443,974 B2
(45) Date of Patent: *Oct. 28, 2008

(54) METHODS, SYSTEMS, AND PRODUCTS FOR PROCESSING CALLS

(75) Inventors: James C. Bedingfield, Sr., Lilburn, GA (US); Robert A. Koch, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 280 days.

This patent is subject to a terminal disclaimer.

(21) Appl. No.: 11/510,374

(22) Filed: Aug. 25, 2006

(65) Prior Publication Data

US 2007/0116249 A1 May 24, 2007

Related U.S. Application Data

(63) Continuation of application No. 10/123,975, filed on Apr. 16, 2002, now Pat. No. 7,103,168.

(51) Int. Cl.
H04M 3/42 (2006.01)
H04M 3/44 (2006.01)

(52) U.S. Cl. ............... 379/216.01; 379/355.01; 379/355.05

(58) Field of Classification Search ............ 379/201.01, 379/201.02, 201.03, 201.12, 216.01, 355.01, 379/355.04, 355.05, 357.03
See application file for complete search history.

(56) References Cited

U.S. PATENT DOCUMENTS 7,103,168 B2 * 9/2006 Bedingfield et al. ..... 379/216.01

* cited by examiner

*Primary Examiner*—Harry S Hong
(74) *Attorney, Agent, or Firm*—Scott P. Zimmerman, PLLC

(57) ABSTRACT

Methods, systems, and products are disclosed for processing calls. A dialed digit string is received and analyzed to determine whether the dialed digit string is a complete string according to a dialing plan of a service provider. If the dialed digit string is a complete string, then the call is sent for routing to the dialed digit string. If the dialed digit string is not a complete string, then it is determined whether the dialed digit string is a valid string according to a calling party's personal dialing plan. If the dialed digit string is valid, then a number is retrieved that corresponds to the dialed digit string according to the calling party's personal dialing plan. The call is then routed to the number.

13 Claims, 7 Drawing Sheets

NXX-NYY-ZZZZ

1 - N can be any digit from 2 to 9
2 - X, Y, and Z can be any digit from 0 to 9
3 - NXX is the numbering plan area (NPA) code
4 - NYY is the central office code or prefix
5 - ZZZZ is the telephone line number

Fig. 2 international access number-country code-city code-telephone line number

1 - international access number in the U.S. is 011
2 - country code is defined by the World Numbering Plan and can range from one digit to three digits
3 - city code is optionally defined by each country
4 - telephone line number is defined by each country's numbering plan

Fig. 3

METHODS, SYSTEMS, AND PRODUCTS FOR PROCESSING CALLS

CROSS-REFERENCE TO RELATED APPLICATIONS

This application is a continuation of U.S. application Ser. No. 10/123,975, filed Apr. 16, 2002 and entitled "Methods and systems for Implementing Personal Dialing Plans," now issued as U.S. Pat. 7,103,168, and incorporated herein by reference.

FIELD OF THE INVENTION

The present invention relates to telecommunications and more particularly relates to systems and methods for implementing personal dialing plans for users of telecommunications systems, such as the public switched telephone network (PSTN) and wireless systems.

BACKGROUND OF THE INVENTION

As telecommunications technologies advance, new and different telecommunications services are being offered to consumers. Many households now have two or more telephone lines, and many people carry portable telephones, also known as mobile or cellular telephones. This means that a person is often associated with several telephone numbers, also known as calling line numbers or directory numbers. An individual's business card may list as many as six different directory numbers including an office telephone number, an office fax machine number, a mobile telephone number, a pager number, a home telephone number, and a home fax machine number.

Because of the expanded demands for telecommunications service, a metropolitan area that was adequately served by a single area code for over fifty years suddenly needs two or more area codes to accommodate all of the telephones, fax machines, pagers, computer modems, and mobile phones in that area. As a result, a user calling someone in a nearby neighborhood, in some cases merely across the street, may need to dial a string of ten or eleven digits instead of the traditional seven digits required in the United States. In addition to the inconvenience of longer dialing strings, it becomes increasingly difficult to remember all of the directory numbers that the user frequently calls.

The telecommunications industry has provided some relief by including programmable memories in telephones and other communications equipment, allowing users to store the directory numbers of frequently-called friends, relatives, and business associates. After storing the selected directory numbers into the equipment memory, the user need only press a button assigned to, for example, a brother's home telephone, and the telephone will automatically retrieve the brother's directory number from memory and dial it for the user. However, such memory-equipped telephones typically have limited storage capacity, and the stored directory numbers are only available when using that particular telephone. If the user uses a different telephone connected to the same telephone line, unless the second phone has been separately programmed with the same list of directory numbers, it will be necessary to dial the entire directory number because the first phone's memory is not accessible through the second phone.

Another solution provided by the telecommunications industry is a network-based speed dialing list. The user stores frequently-called directory numbers in a list maintained in memory within the telecommunications network and each stored directory number is assigned a speed dialing code. The speed dialing code is defined by the telecommunications service provider and can be, e.g., "*01" for the first memory location, "*02" for the second memory location, and so on. The speed dialing list is generally associated with the telephone line and, thus, is available to any telephone, or other communications equipment, connected to that telephone line. However, the user must remember who is associated with each assigned speed dialing code, for example, "*01" calls the brother's home telephone, "*02" calls the brother's mobile phone, "*03" calls the office fax machine, etc. For a speed dialing list with a large number of entries, it can be difficult to remember the correct speed dialing code associated with the party to be called without keeping a reference list at hand to look up the numbers. Without such a reference, existing speed dialing methods actually create a new problem of memorizing speed dialing code digits that are more or less arbitrarily assigned and have no relationship with the actual directory number in such a way that would trigger the user's memory of the party associated with any given speed dialing code.

Yet another solution provided by the telecommunications industry is the Centrex system, manufactured by companies such as Nortel Networks and Lucent Technologies. The Centrex system is an abbreviated dialing system that is used primarily by businesses. For example, many businesses allow users to dial a three or four digit extension to reach other people in their office or company. With Centrex, there is a defined group, where each member of the group is assigned an extension number, and a single defined dialing plan for all users. To reach users outside of the defined group, an escape code, such as dialing "9," is typically required to be entered by a user. Thus, Centrex provides abbreviated dialing based on a dialing plan with predefined rules, not based on any customization by the user.

Accordingly, there is a need for a system and method for implementing a personal dialing plan where a user can incorporate an abbreviated dialing scheme with a list or register of directory numbers of the people or locations that the user most frequently calls. There is a further need for a system and method for implementing a personal dialing plan where a user can set customized rules for abbreviated dialing based on the user's preferences and telephone service plan. Additionally, there is a need for a system and method for implementing a personal dialing plan where a user may access the user's directory number register from remote locations and where customized dialing rules are accessible and applicable from more than a single telephone or single telephone line associated with a user.

SUMMARY OF THE INVENTION

The present invention provides a network-based personal dialing plan which allows a user to associate dialing strings of any length with easy-to-remember, user-selected aliases. A user may also define dialing rules, such as automatically adding digits necessary for the network to understand the destination directory number when the called number would be a long distance call from the calling location. An exemplary system according to the present invention is installed in a telecommunications network and accessible by a service switching point (SSP) and a service control point (SCP).

According to the present invention, a user may access the system to create or modify the user's personal dialing plan by voice telephone call (in a network having VXML capability), web interface, or other device, such as a wireless application protocol (WAP) phone or wireless personal digital assistant (PDA). The user enters a complete dialing string for a destination directory number and assigns an alias for this dialing string. After storing this destination number, the user can dial the defined alias in lieu of the complete destination number to call the destination number. For example, a user may enter 202-555-1414 and assign "1414" as the alias for this entry. Later, to call this same directory number, the user simply dials 1414 to be connected with the desired telephone number.

In one embodiment, a special feature digit, such as "*" or "#," may be used to indicate to the SSP that the digit string is to be interpreted according to the user's personal dialing plan. In another embodiment, the "#" key, or another special purpose key, may be used as an end-of-dialing delimiter or trigger to the SSP to interpret the digit string as an alias. If the personal dialing plan is implemented on a personal computer (PC) or smart phone, the alias is not limited to numbers, but may consist of a string of alphanumeric characters. A directory and rules may be stored locally on "smart" devices, or they may be stored centrally, providing access to a common register of directory numbers and/or set of rules from multiple locations. In an alternate embodiment, the directory and rules may be stored in a portable memory device, such as a smart card, that can be attached to various public or private telephone devices.

The present invention also allows users to set up other dialing rules. A user may, for example, set up a rule to automatically add the digit "1" whenever the user wants to make a long distance call. The user may establish a dialing rule that checks whether the area code dialed is local to the user's area, as determined by the user's directory number, whenever the user dials a ten digit string for a destination directory number. If the area code is not local, the system according to the present invention may automatically add "1" to the ten digit string before dialing it. If the area code is same as the user's area code, the system will decide, based on user-specified or network-based rules, whether to dial the dialed string including the area code or to dial the destination directory number without the area code. The decision is based on the SSP routing rules of the local telephone service provider's dialing plan. In areas where ten-digit directory numbers are used, since local charges may still apply when calling a different local area code, the user may define the rule that "1" is to be added to all directory numbers having area codes other than the two or three area codes in which local calls may be made.

These and other objects, features, and advantages of the present invention may be more clearly understood and appreciated from a review of the following detailed description of the disclosed embodiments and by reference to the appended drawings.

BRIEF DESCRIPTION OF THE DRAWINGS

FIGS. 2 and 3 show definitions of a ten digit dialing string, typically used in the United States, and an international dialing string, respectively.

DETAILED DESCRIPTION OF THE INVENTION

The following detailed description utilizes a number of acronyms which are generally well known in the art. While definitions are typically provided with the first instance of each acronym, for convenience, Table 1 below provides a list of the acronyms and their respective definitions.

TABLE 1

| ACRONYM | DEFINITION |
| --- | --- |
| AIN | Advanced Intelligent Network |
| ANI | Automatic Number Identification |
| DTMF | Dual Tone Multi-Frequency |
| IP | Intelligent Peripheral |
| ISDN | Integrated Service Digital Network |
| MSC | Mobile Switching Center |
| NANP | North American Numbering Plan |
| OHD | Off-Hook Delayed |
| OHI | Off-Hook Immediate |
| PC | Personal Computer |
| PDA | Personal Digital Assistant |
| PIN | Personal Identification Number |
| PRI | Primary Rate Interface |
| PSTN | Public Switched Telephone Network |
| SCN | Service Circuit Node |
| SCP | Service Control Point |
| SMS | Service Management System |
| SPA | Service Package Application |
| SS7 | Signaling System 7 |
| SSP | Service Switching Point |
| STP | Signal Transfer Point |
| TCAP | Transaction Capabilities Application Part |
| TCP/IP | Transmission Control Protocol/Internet Protocol |
| VXML or VoiceXML | Voice Extensible Markup Language |
| WAP | Wireless Application Protocol |

Figure 1:
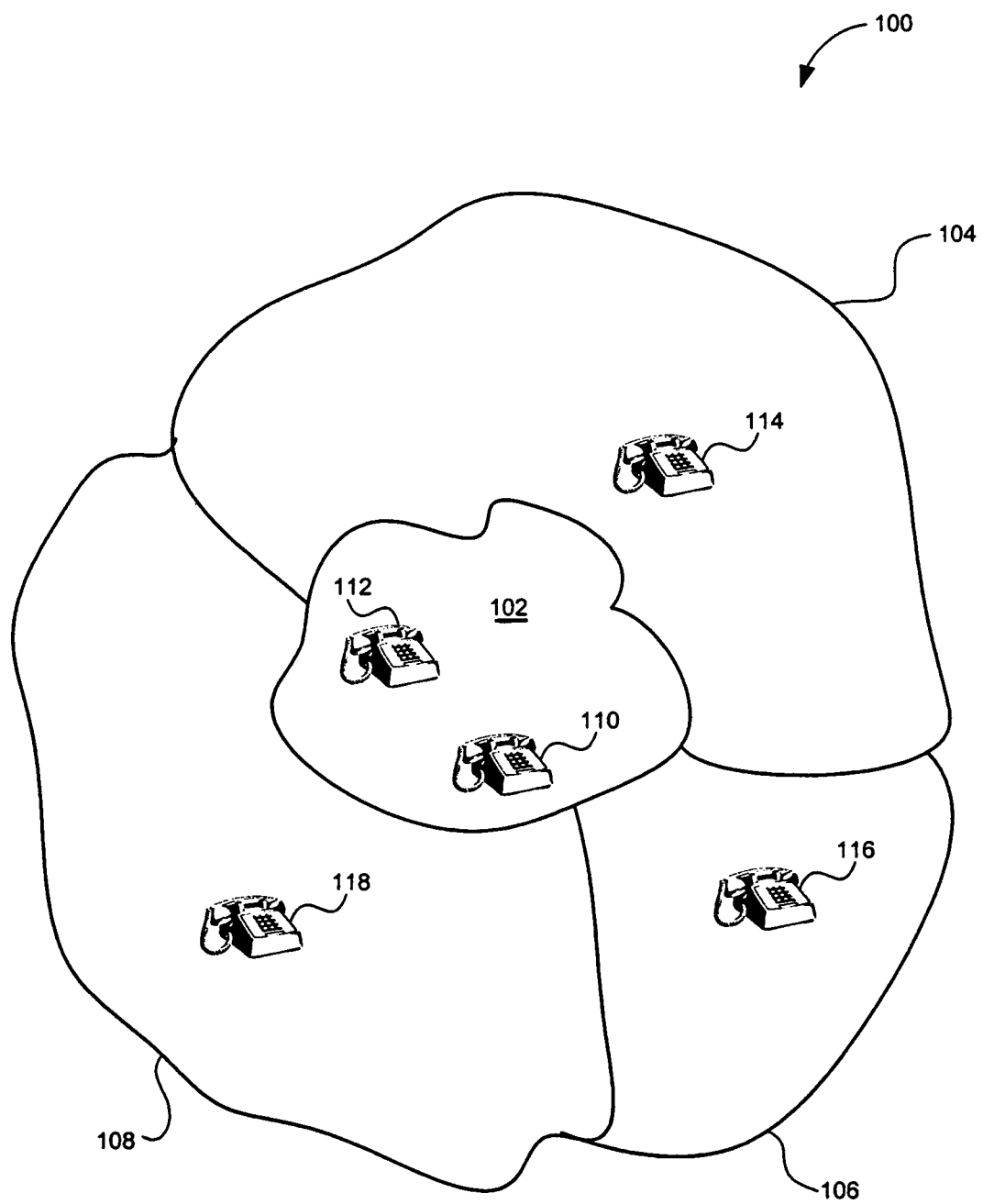
FIG. 1 illustrates an exemplary metropolitan area with multiple telephone area codes.

Referring now in greater detail to the drawings, FIG. 1 illustrates a typical metropolitan area 100 with more than one area code. A city center 102 has one area code and surrounding areas 104, 106, and 108 have area codes different from the area code assigned to city center 102 and different from each other. In some metropolitan areas (e.g., Atlanta), there may also be an "overlay" area code that covers the same geographical area as two or more other area codes. As shown in FIG. 1, telephones 110 and 112 are within city center 102, telephone 114 is within area 104, telephone 116 is within area 106, and telephone 118 is within area 108. In this exemplary metropolitan area, telephone numbers include area codes based on the area within which the telephone is located.

Depending on the implementation of dialing plan by the local telephone service provider, a user at telephone 110 may dial a ten or eleven digit string to reach a user at another one of the telephones. Certain dialing plans, for example, those including an overlay area code, require the user at telephone 110 to dial a complete ten digit string to reach a user at telephone 112, even though they are assigned the same area code. For example, in the Atlanta area, there are three area codes, 404, 770, and 678, serving the metropolitan area. When a user at an office in the 404 calling area calls a number in the 770 calling area, the user must dial the entire ten digit number, but need not dial an access code "1" before the area code. The user must also dial the area code, 404, to call a directory number at an adjacent building with the same area code. In such cases, the area code cannot be omitted because the dialing plan requires the use of all ten digits.

In another example, in the Chicago area, three area codes serve the metropolitan area: 312, 630, and 847. A user working in downtown Chicago, within the 312 area, does not need to include the area code when dialing a number with the same area code. The user needs to dial only a seven digit string. However, the user must dial "1" and the entire ten digit string when calling a number in the suburbs in the 630 calling area, even though the call will not be charged as a long distance call.

Directory numbers in North America are defined according to the North American Numbering Plan (NANP). Generally, a directory number is defined as a ten digit number as shown in FIG. 2. The ten digit number is composed of a three digit area code, a three digit central office prefix, and a four digit telephone line number. As explained above, whether to dial the entire ten digits or to add a "1" before dialing a ten digit string is dependent on the local service provider's dialing plan.

A dialing string becomes even lengthier when making a call to a party in another country. FIG. 3 illustrates the format of a dialing string for an international directory number. The international dialing string is composed typically of an international access code, which is generally "011," a country code, a city code, and a telephone line number. The country code may be one to three digits, the city code may be one to four digits, and the telephone line number may be six to eight digits. For example, when dialing to a destination directory number in the city of Sao Paulo in Brazil, a total of fifteen digits is required.

Figure 4:
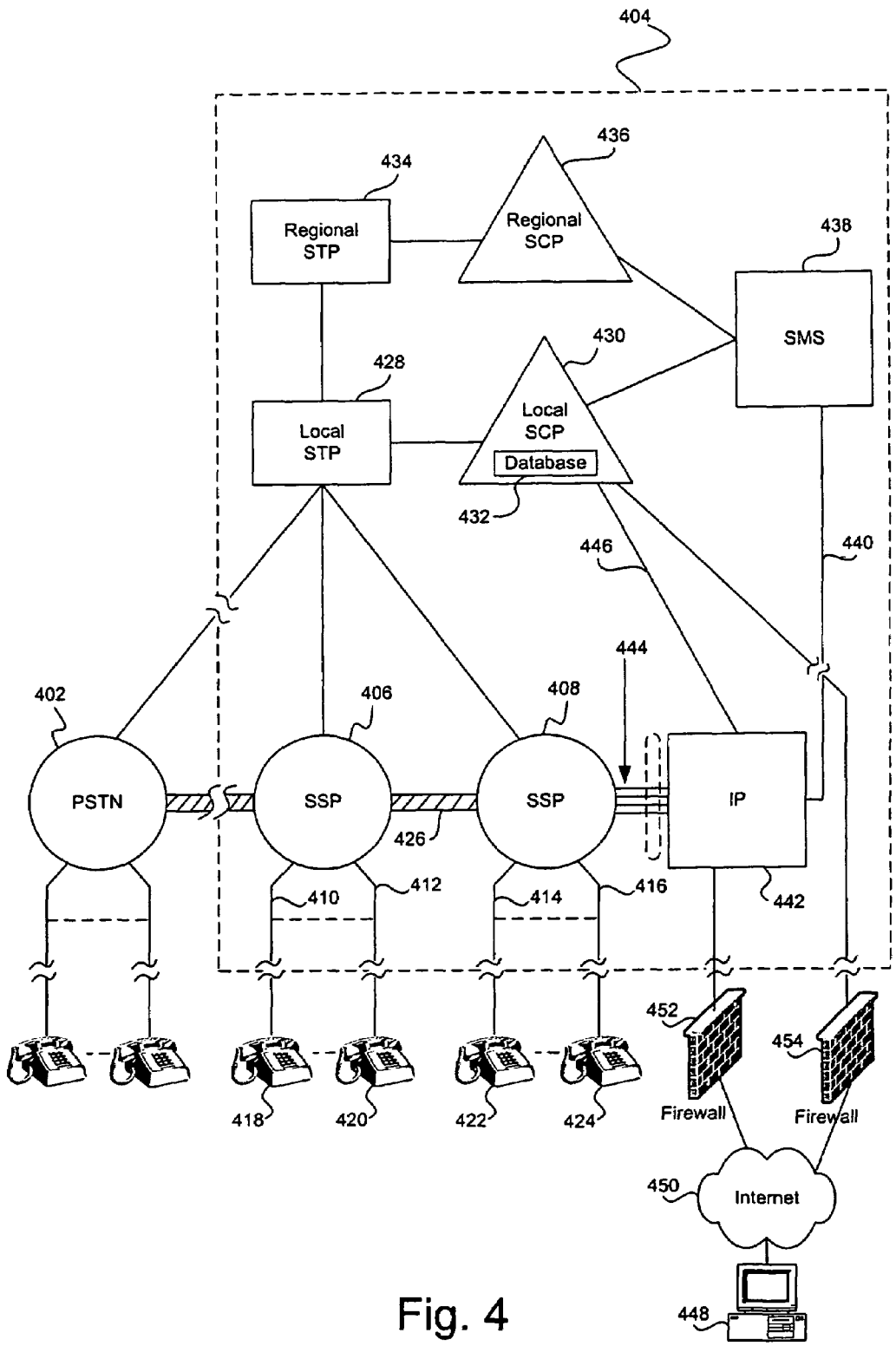
FIG. 4 illustrates an exemplary environment and a block diagram of an exemplary embodiment of the present invention.

FIG. 4 is a diagram of an exemplary embodiment and exemplary environment for operation of exemplary methods and systems of the present invention. Connected to a public switched telephone network (PSTN) 402, an exemplary environment is an Advanced Intelligent Network (AIN) 404. For brevity, only a basic explanation of AIN 404 is provided. Where AIN 404 operates or is composed differently in an important aspect from that which would be understood by those skilled in the art, additional details are provided herein. For further information regarding the referenced AIN 404 and aspects thereof, the interested reader is referred to the commonly assigned patent to Weisser, U.S. Pat. No. 5,430,719, which is incorporated herein by reference.

AIN 404 includes a variety of interconnected network elements. A group of such network elements includes the plurality of central offices which are indicated as service switching points (SSPs) 406 and 408 in FIG. 4. An SSP typically includes switch functionality, but also includes other functionality so as to communicate with other AIN elements as those skilled in the art understand. As further illustrated in FIG. 4, SSPs 406 and 408 have a plurality of subscriber lines, or calling lines, connected thereto. Each SSP serves a designated group of calling lines, and thus, the SSP that serves a particular calling line may be referred to as its serving SSP. For example, SSP 406 serves calling lines 410 and 412, while SSP 408 serves calling lines 414 and 416. Each calling line is connected typically to a piece of terminating equipment including a plurality of telephones individually referenced as 418, 420, 422, and 424. Although telephones are illustrated as the pieces of terminating equipment in FIG. 4, those skilled in the art will understand that such pieces include other telecommunications devices such as facsimile machines, computers, modems, etc.

Pursuant to a preferred embodiment, each active calling line in an AIN is assigned a multi-digit calling directory number. In the U.S., the directory number typically consists of ten digits. In the description of the present invention, the term "directory number" is used in its generally understood meaning to be the number which is dialed or input by a caller or source and used by the network to route the communication so as to reach a piece of terminating equipment on a calling line associated with the dialed directory number. A directory number is commonly referred to as a telephone number or calling line number.

SSPs 406 and 408 are interconnected by a plurality of trunk circuits 426. These are the voice path trunks that interconnect the SSPs to connect communications. The term "communication" or "call" is used herein to include all messages that may be exchanged between a caller (or calling party or originating party or subscriber) and a called party or destination.

Each of SSPs 406 and 408 is connected to another type of AIN element referred to as a local signal transfer point (STP) 428 via respective data links using the Signaling System 7 (SS7) protocol, which is well known in the art. Much of the intelligence of the AIN resides in yet another type of AIN element referred to as a local service control point (SCP) 430 that is connected to STP 428 over an SS7 data link. Among the functions performed by SCP 430 are the maintenance of network databases and subscriber databases as represented collectively by databases 432. Databases 432 may be used in providing telecommunication services to a subscriber. Typically, SCP 430 includes service package applications (SPAs) that are used in connection with or as part of databases 432 in the application of telecommunication services or enhanced features to calling lines.

Local STP 428 may be connected to other network elements of AIN 404 through a regional STP 434, which in turn may be connected to a regional SCP 436. Both SCP 436 and SCP 430 are connected via respective data links to a service management system (SMS) 438. SMS 438 interfaces to business offices of the local exchange carrier (LEC) and interexchange carriers (IXCs).

In order to keep the processing of data and calls as simple as possible, a relatively small set of triggers is defined at the SSPs for each call. There are three types of triggers: originating, terminating, and dialing plan. With regard to the present invention, a trigger in the AIN is an event associated with a particular calling line (i.e., originating) that generates a packet to be sent to an SCP. The trigger causes the SCP to query its Service Package Applications (SPAs) and databases for processing instructions with respect to the particular call. The results are sent back to the SSP in a response from SCP 430 through STP 428. The return packet includes instructions to the SSP as to how to process the call. The instructions may be to tell the SSP to take some special action as a result of a customized calling service or enhanced feature, such as a personal dialing plan. In response, the SSP moves through its remaining call states, collects the dialed digits, and may generate further packets that are used to set up and route the call.

SMS 438 also is connected via a data link 440 to one or more intelligent peripherals such as the illustrated intelligent peripheral (IP) 442. In an exemplary environment, IP 442 may be a service circuit node (SCN). By this data link 440, SMS 438 provides IP 442 with information relating to new subscribers and updates for existing subscribers, and with information relating to network operations such as new services, upgrades to existing services, measurements, audits, and maintenance. The IP 442 that receives information from SMS 438 may be one of many kinds of elements used in telecommunication services. IP 442 includes voice and dual tone multi-frequency (DTMF) signal recognition devices and voice synthesis devices.

In addition, IP 442 is connected to one or more (but usually only a few) SSPs via Integrated Service Digital Network (ISDN) links 444 as shown by the connection to SSP 408.

Optionally, IP 442 may be connected to one or more SCPs via a TCP/IP connection, such as TCP/IP connection 446 which connects IP 442 to SCP 430. Also, a personal computer (PC) 448 may be connected to SCP 430 and IP 442 via Internet 450. Firewalls 452 and 454 may also be present.

According to exemplary systems and method of the present invention, aliases and dialing rules may be entered into a personal dialing plan service. An exemplary system according to the present invention enables a user to call a party without having to dial a long string of numbers by selecting meaningful aliases that the user can readily associate with the party to be called. Prior to using a personal dialing plan to place a call, telephone 418 is utilized by the user to configure the user's personal dialing plan. The user dials a special configuration access code, for example, *333, to access the personal dialing plan service. The user may also dial a special configuration directory number to set up or modify a personal dialing plan. After the user dials the special access code or the special directory number, the call is answered by SSP 406 serving telephone 418. After examining the dialed string, SSP 406 recognizes the instruction to access a personal dialing plan and forwards the call information to SCP 430 via STP 428. SCP 430 receives the call information and routes it to IP 442.

IP 442 provides means for interacting with the user. IP 442 may be physically adjacent to or remote from SCP 430 and is accessible via a data link, such as TCP/IP connection 446. IP 442 prompts the user to enter dialing strings and an alias associated with each dialing string. A complete dialing string could be a seven digit string or a ten digit string, depending on the local service provider's dialing plan, for calls made within the U.S. For international telephone numbers, a complete dialing string may be anywhere from eight to fifteen digits, not including the international access code. The information from the user is then stored in a database in IP 442. Alternatively, the information from the user may be stored in SCP 430 or databases 432, and IP 442 may be used to collect digits, play tones, and play or display names.

In another embodiment, the user may use computer 448, rather than telephone 418, connected to SCP 430 and IP 442 via Internet 450 to set up a personal dialing plan by entering information through a graphical user interface (GUI) using a keyboard, mouse, or other peripheral device. The user may also use a telephone equipped with dual tone multi-frequency (DTMF) dialing. If IP 442 is equipped with voice recognition technology, e.g., VoiceXML, the user may also create a personal dialing plan by accessing the voice recognition function and speaking into the telephone.

As an example, a user at telephone 418 may create an alias for telephone 424. The user dials an access code to gain access to IP 442 and sets up an alias for telephone 424. The user may use the last four digits of the directory number associated with telephone 424 number as the alias. Other aliases that will help the user associate the alias with the party at telephone 424 may be selected. For example, the alias could be the person's birthday, or the digits can be selected according to the letters associated with the digits on a telephone keypad, where the letters spell the called party's name or nickname. Other possible variations will be apparent to those of skill in the art. If the personal dialing plan is implemented on a PC that has dialing capabilities or a smart phone, the alias may consist of a string of letters, numbers, or a combination thereof. Note, however, that this may make it difficult to dial the alias from a conventional telephone.

After setting up the alias, the user may simply dial the alias whenever the user wants to reach the party at telephone 424. For example, the user may dial *5678 from telephone 418, and this string, "*5678," is interpreted by SSP 406. SSP 406 interprets it as an alias for a personal dialing plan and forwards it to SCP 430 for further interpretation. SCP 430 receives the alias and retrieves the corresponding dialing string, for example, 404-234-5678, from IP 442. The retrieved dialing string is returned to SSP 406 as the translated destination directory number to which the user's call is to be routed. SSP 406 then replaces "*5678" with "404-234-5678" and routes the call accordingly. The call is then routed to SSP 408, which serves telephone 424, via STP 428. SSP 408 then connects the call to telephone 424.

In an alternate embodiment, the personal dialing plan service may be implemented on a web server that also has dialing capabilities. The user enters information through fields on a personal dialing plan web page. Software functionality, such as Java, is used to collect the digits and send them to the web server. The server then interprets the results and implements the service logic necessary to route the call. In another embodiment, a personal dialing plan service may be implemented in a personal computer or "smart" phone that is capable of executing service logic and either storing information or accessing stored information across an appropriately-connected network.

Figure 5:
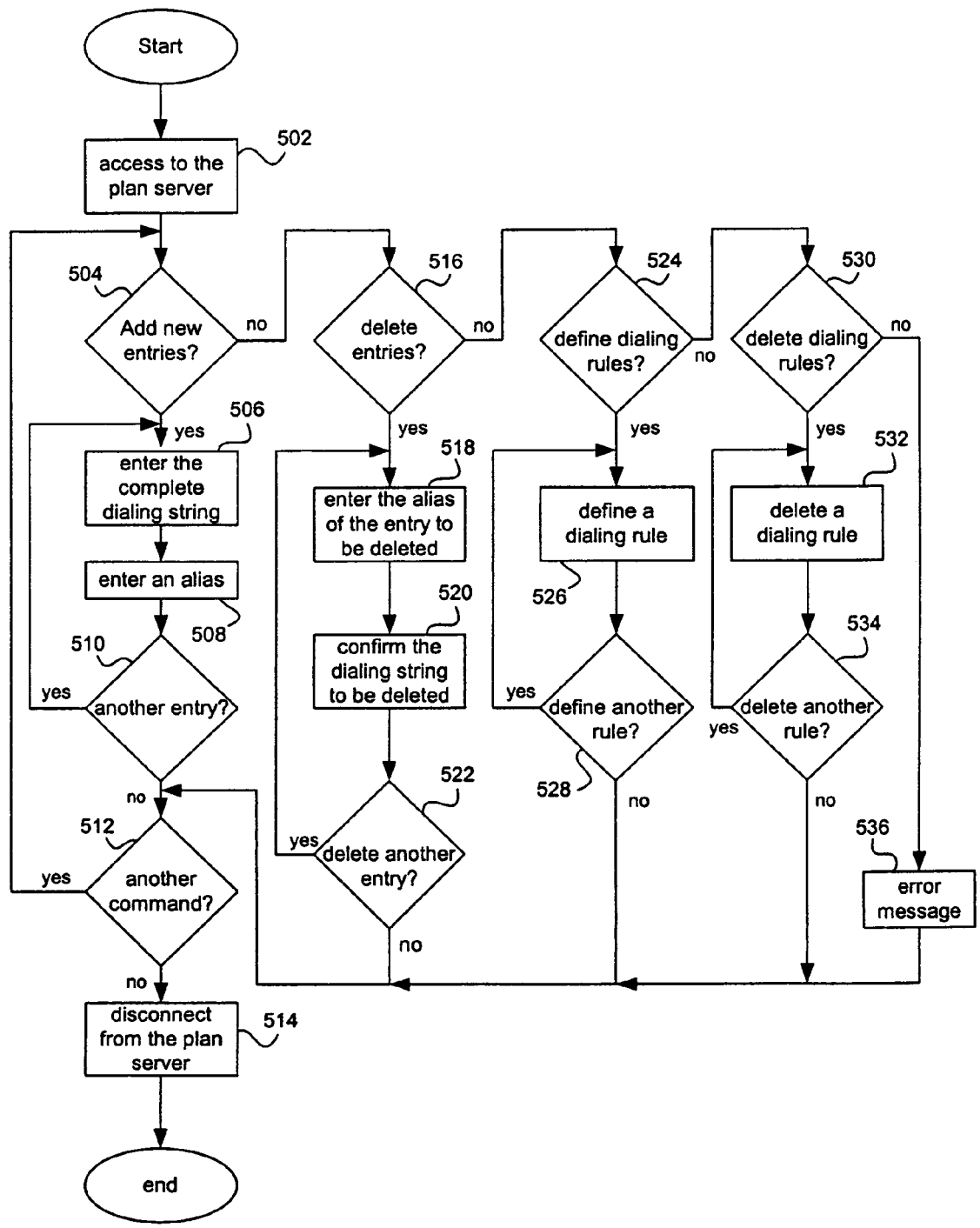
FIG. 5 is a flow diagram illustrating an exemplary method for implementing an exemplary system of the present invention.

FIG. 5 is an exemplary flow chart for a method of configuring a personal dialing plan according to an embodiment of the present invention. The user accesses a server, intelligent peripheral (IP), or other platform where a personal dialing plan service is implemented by dialing a feature code or an access telephone number, block 502. The server receives the user's request and may execute some authentication process, such as asking for a personal identification number (PIN) before allowing the user to access or create a personal dialing plan.

After verifying that the user is a subscriber to the personal dialing plan service, the user's access is granted. The server prompts the user with a menu of activities and asks the user to enter a selection. For example, the user may be requested to press "1" to add an entry, press "2" to delete an entry, press "3" to define a dialing rule, or press "4" to delete a dialing rule. If the user wants to create a new alias, block 504, the user is prompted to enter the complete dialing string, block 506. The complete dialing string is a dialing string recognizable by the local telephone service provider's dialing plan. For example, if the local telephone service provider's dialing plan requires dialing of a ten digit string when calling a neighbor located next door, then the user must enter the complete ten-digit directory number. If the entry is for dialing a long distance number, then the access code "1" must precede the complete directory number. If the local service provider's dialing plan allows for seven digit dialing for calls made within the same area code, then a complete dialing string may include only seven digits.

After entering the complete dialing string, the server prompts the user to enter an alias to identify the complete dialing string. The user may enter an easy to remember string as the alias, block 508. For example, if the user is setting up an alias for a client's telephone number and the client is the only party that the user calls with a directory number that includes the "630" area code, the user can use "630" as the alias for the client's telephone number. If a terminal character is used, then the alias is not required to be of fixed length. For example, the user may set up another alias, "2345," for a friend's mobile phone by entering "2345#," in which case the "#" key is used to indicate the end of the alias. Alternatively, the user can define a dialing rule, as discussed in more detail below, where all aliases are, for example, four digits in length.

Before accepting the alias, the server determines whether the alias has been assigned to another entry in the dialing plan. If the alias has been previously assigned to another entry, the server will prompt the user to enter a different alias for the dialing string or ask whether the user wishes to replace an existing entry with a new dialing string. After the user enters the alias, the server checks whether the user wants to save another entry, block 510, or perform another command, block 512. If the user does not want to enter additional dialing strings or commands, the user is disconnected from the server, block 514. Optionally, the server may query the user as to whether the user wants to test an alias once that alias has been entered by the user. If the user chooses to test the alias, a call is initiated by the server.

The user may choose to delete an existing entry from the dialing plan, block 516. The user enters an alias that identifies the entry, block 518, and the entry is retrieved from the dialing plan and presented to the user for confirmation. The user confirms the retrieved entry is to be deleted, block 520, and the entry is deleted from the dialing plan. At the end of deletion, the server queries whether the user wants to delete another entry, block 522, or enter another command, block 512.

The user may also define other dialing rules to be applied to calls originating from the directory number (or numbers) for which the user has subscribed to the personal dialing plan service, block 524. For example, if the user's telephone service provider has a dialing plan that requires a ten digit dialing string even when calling a next door neighbor, the user can specify that the user's area code be added whenever seven digits are dialed. The user may also specify several area codes for which the long distance access code "1" need not be dialed, and the system will determine whether a dialed string has one of the specified area codes before adding "1" to the dialed string. The user defines a dialing rule, block 526. The user is then prompted whether the user wishes to define another dialing rule, block 528.

Another rule option that the user may program is a timer that can be used to set a delay period after the last character or number of the alias is dialed at which time the system proceeds with its search for the dialing string associated with the alias that was entered, without waiting for a separate termination indicator. A timer option may provide a senior user or a physically-disabled user a means to establish a dialing rule that adapts to the user's physical condition. For example, a dialing rule may be defined to allow extra time between input of each digit so that the SSP's dialing timer will not expire before the user enters all of the digits.

The user can also enter a command to delete an established dialing rule, block 530. The user may select the rule to be deleted from a list of rules displayed by the server, or the user may specify the rule by entering a code that identifies the rule, block 532. The user is then prompted whether the user wishes to delete another dialing rule, block 534. If the user enters a command that is not recognized by the server, an error message is played, block 536, and the user is prompted to enter another command.

Figure 6:
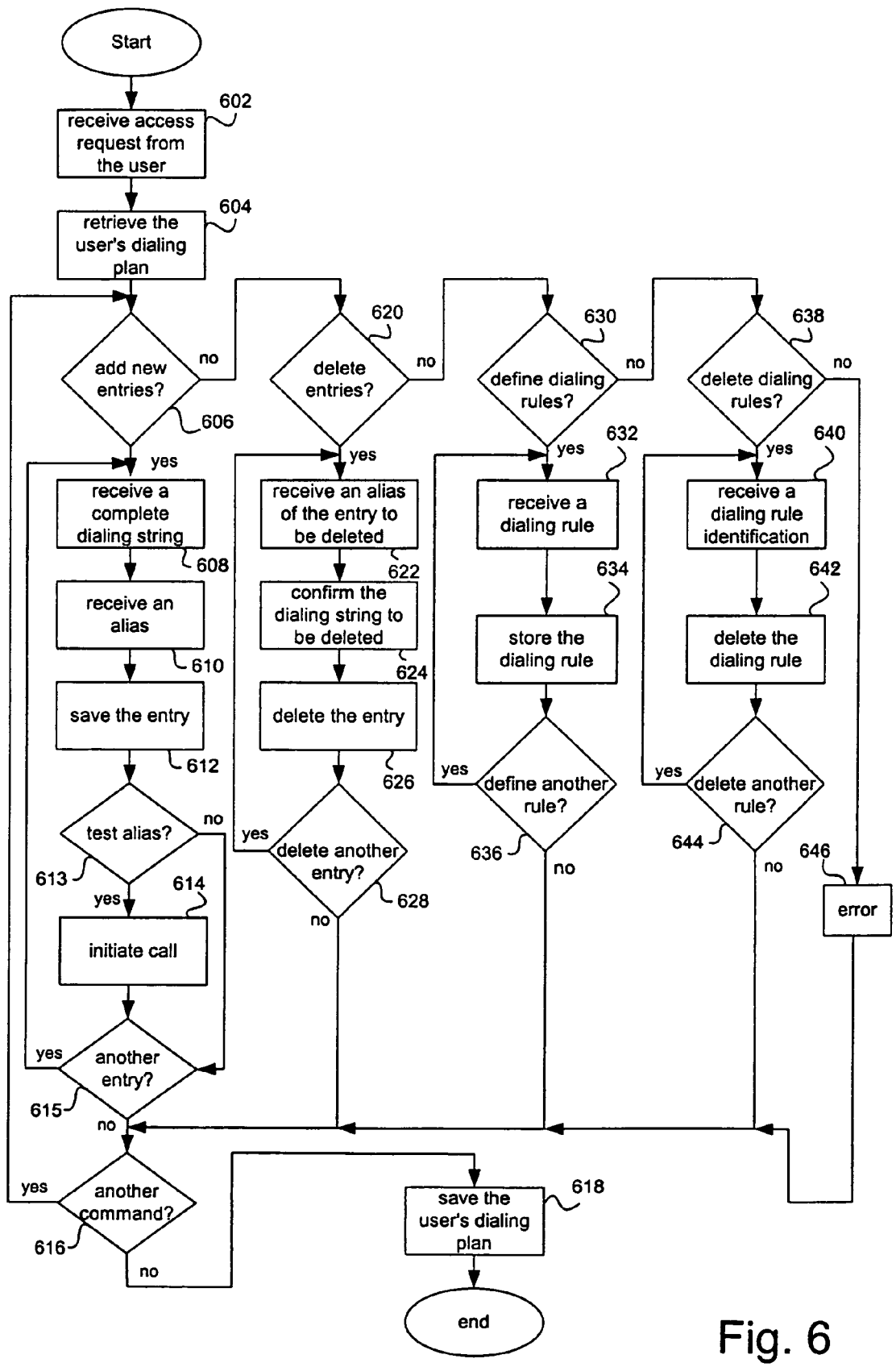
FIG. 6 is a flow diagram showing an exemplary method of operation of the present invention.

FIG. 6 is a flow chart for a dialing plan set up process according to an embodiment of the present invention. A server, IP, or other platform where a personal dialing plan service is implemented receives the access request from the user, block 602, and the server may invoke an authentication process before allowing the user to create or modify a dialing plan. After the user provides a proper PIN or other identification information, the server retrieves the user's dialing plan, block 604. A dialing plan is associated with and identified by at least one directory number, and the server may obtain the directory number from the user's input or from the automatic number identification (ANI) feature of the serving SSP. If there is no dialing plan associated with the directory number, a new one is created. The server prompts the user with a menu of activities and asks the user to enter a selection.

After the dialing plan is retrieved or created, the server checks for the command received from the user. If the user wants to add a new entry, block 606, the server prompts the user to enter a complete dialing string. The server receives a complete dialing string, block 608, and prompts the user to enter an alias for the dialing string. After the alias is received, block 610, the server saves the dialing string and the alias in an entry, block 612. The server then checks whether the user wants to test the alias, block 613. If the user chooses to test the alias, the server initiates a call, block 614. To initiate a call, the IP has an off-hook immediate trigger, as discussed in further detail below. Once the alias is tested or if the user does not want to test the alias, the server prompts the user whether the user wants to save another entry, block 615, or enter another command, block 616. If the user is done with the dialing plan, the server saves the dialing plan, block 618.

If the user's command is to delete an entry from the dialing plan, block 620, the user enters an alias associated with the entry to be deleted, block 622, and the server retrieves the entry and presents the retrieved entry to the user for confirmation, block 624. An alternate approach to this step is to make the "delete" action a two-step action, where the first step is to present a list of current entries for selection and the second step is deletion of the selected entry. After the user confirms the entry is to be deleted, the server deletes the entry from the dialing plan, block 626, and checks whether the user wants to delete another entry, block 628, or enter another command, block 616. If the user has completed modifying the dialing plan, the server saves the dialing plan, block 618.

If the user wants to define a dialing rule, block 630, the user specifies the rule, and the system receives the rule, block 632, and stores the rule in the dialing plan, block 634. The dialing rule may be assigned an identification number, so that the user can later delete the rule by its identification number. After storing the dialing rule, the server checks whether the user wants to define another dialing rule, block 636, or enter another command, block 616, before saving the dialing plan, block 618.

If the user wants to delete a dialing rule, block 638, the server receives a dialing rule identification from the user, block 640, and deletes the identified dialing rule from the dialing plan, block 642. Similar to what has been described above, the server checks whether the user wants to delete another dialing rule, block 644, or enter another command, block 616, before saving the dialing plan, block 618. If the user command is not recognized, the server provides an error message, block 646, and prompts the user for another command, block 616.

Figure 7:
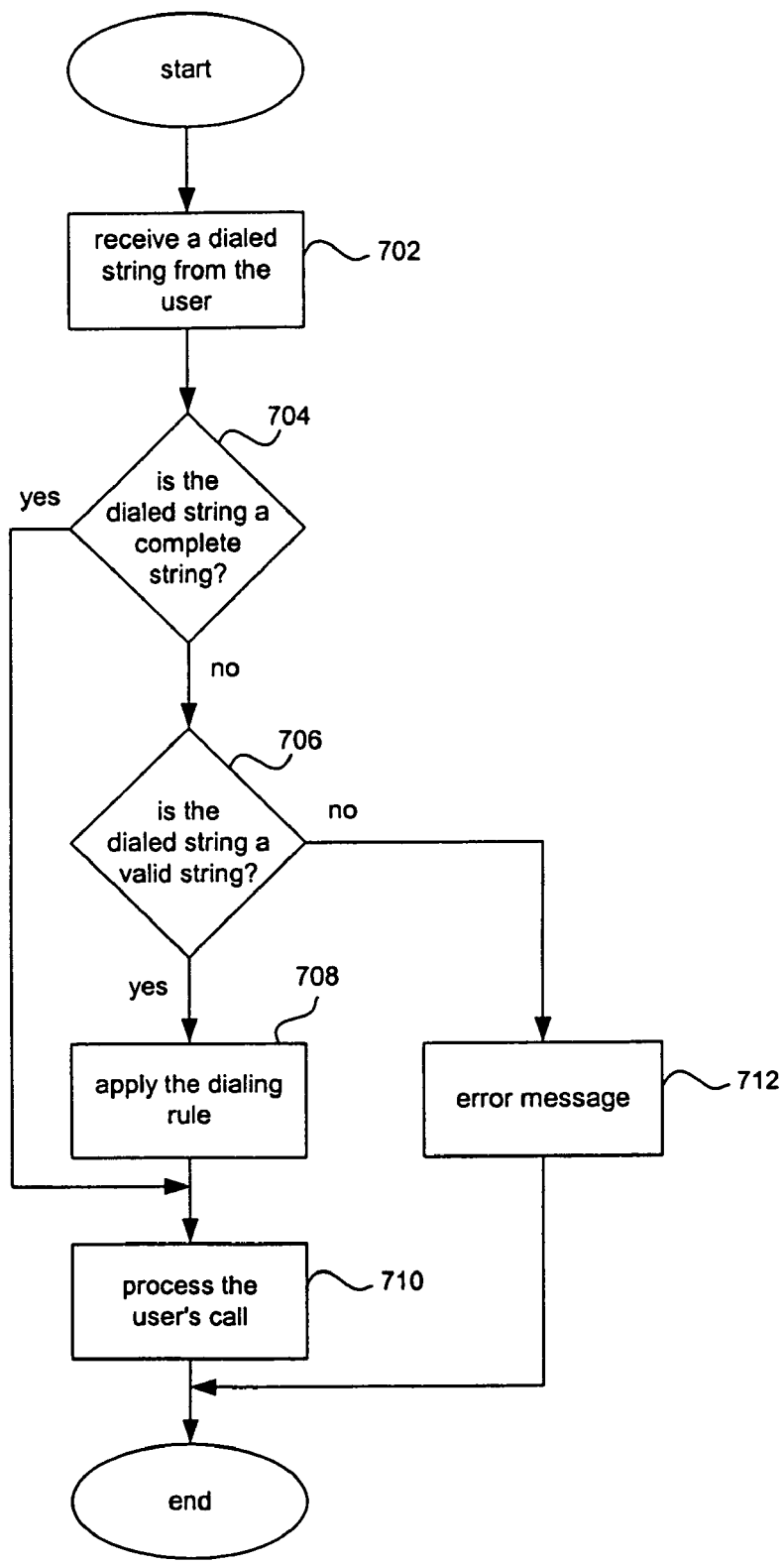
FIG. 7 is a flow diagram illustrating an exemplary method of operation of the present invention.

FIG. 7 is a flow chart illustrating an embodiment of the present invention that is implemented in an AIN or softswitch environment that is part of or connected to the PSTN. FIG. 7 is discussed with reference to elements of the AIN, but it should be understood that equivalent elements of a softswitch environment may be used, such as the softswitch equivalent of the triggers discussed below, an application server instead of an SCP, and so on. The directory and rules are stored in an SCP or in an element or platform accessible to the SCP, such as an IP. The SSP is equipped with an off-hook immediate (OHI) trigger and uses the OHI trigger when handling personal dialing plans. When the user picks up the telephone (i.e., the telephone goes off-hook), the OHI trigger is invoked, and the SSP sends an inquiry to the SCP where the directory and rules are stored before providing a dial tone to the user. Alternatively, an off-hook delayed (OHD) trigger may be used. In the case of using an OHD trigger, the digits entered are collected and analyzed by the SSP and sent to the SCP to determine the corresponding complete directory number according to the user's personal dialing plan. In the case of using an OHI trigger, the caller is immediately connected to an element such as an IP. The IP prompts the user for digit entry and then collects and analyzes the entered digits before performing the same complete directory number determination that the SCP performs when an OHD trigger is used.

Upon recognizing that the user is subscribed to the personal dialing plan service, the SSP collects dialed digits or the SCP redirects the call to the IP where digits are collected. The SSP/IP collects the dialed digits and handles the dialed digit strings according to the personal dialing plan. In the case of an OHI trigger, this may be accomplished in conjunction with a special dialing plan timer associated with the personal dialing plan that defines the allowed time duration between entered digits, using an expiration of this timer as an indication of the end of dialed digit entry. After applying the special dialing plan timer from the personal dialing plan, if any, the SSP/IP checks whether the dialed digit string is a complete string by applying the local service provider's dialing plan rules (e.g., ten digits are required to dial directory numbers with the same area code as the user's directory number) and the user's personal dialing plan. This step may include a query to an external database where the user's aliases and corresponding complete directory numbers are stored. The dialed digit string is first checked against the local service provider's dialing plan and then checked against the user's personal dialing plan.

The SSP/IP receives the dialed digit string, block 702, and checks whether the dialed digit string is a complete dialing string according to the local service provider's dialing plan, block 704. If the dialed digit string is a complete string, then the SSP routes the user's call to its destination, block 710. If the dialed digit string is not a complete string, the SSP then checks whether the dialed digit string is a valid string according to the user's personal dialing plan, block 706. This may be accomplished by comparing the dialed digit string against predefined entries in the user's personal dialing plan contained either in the SCP or another external database. The SCP receives the information on the dialed digit string and checks it against the user's personal dialing plan, accessing an external database if necessary. If the dialed digit string is a valid string according to the user's personal dialing plan, the SCP/external database identifies the complete dialing string associated with the dialed digit string (i.e., alias) and sends the complete dialing string back to the SSP/IP. The SSP/IP receives the complete dialing string, block 708, and substitutes the complete dialing string for the dialed digit string. The SSP/IP routes the user's call using the complete dialing string, block 710. If the dialed digit string is not a valid string, an error message is played to the user, block 712.

The dialed digit string can be a complete dialing string in several ways. The dialed digit string is a complete string if it follows one of rules of the local service provider's dialing plan, for example, a ten digit string preceded by the long distance access code "1"; an international number preceded by the international access code "011"; a ten digit string if the provider's dialing plan utilizes ten digit dialing for local areas; a seven digit string if the provider's dialing plan uses seven digit dialing for local calls or calls within the same area code; any short dialing string for special services such as 911; or a special character followed by a numeric string for special features, such as *69 for call return.

The dialed digit string can also be a valid string if it follows one of rules defined by the user's personal dialing plan according to the present invention. A valid string can be converted to a complete string by following rules defined in a personal dialing plan. The user may define multiple dialing rules for a personal dialing plan, for example:

a short string preceded and/or followed by a special character such as "*" or "#," or a combination of these special characters, used to retrieve a complete dialing string according to the local service provider's dialing plan; the user's area code is added to any seven digit string, if the local service provider's dialing plan requires ten digit dialing for numbers within the same area code; the access code "1" is added to any ten digit string, if the call is a long distance call; and a dialing timer that is different from any timer that may be used as part of the local service provider's dialing plan.

The rules listed above are exemplary rules and the user may specify any other dialing rule that the user finds helpful.

If the dialed string is a valid string according to one of dialing rules of the personal dialing plan, the SSP applies the rule to obtain a complete dialing string that is recognized by the local service provider's dialing plan. After obtaining the complete dialing string, the SSP/IP routes the user's call using the complete string. For example, if the dialed string is "*1234" and the user has defined a dialing rule that associates "1234" with "404-987-1234," then "404-987-1234" is used by the SSP/IP as the complete dialing string, and the user's call is routed to that directory number.

Figure 8:
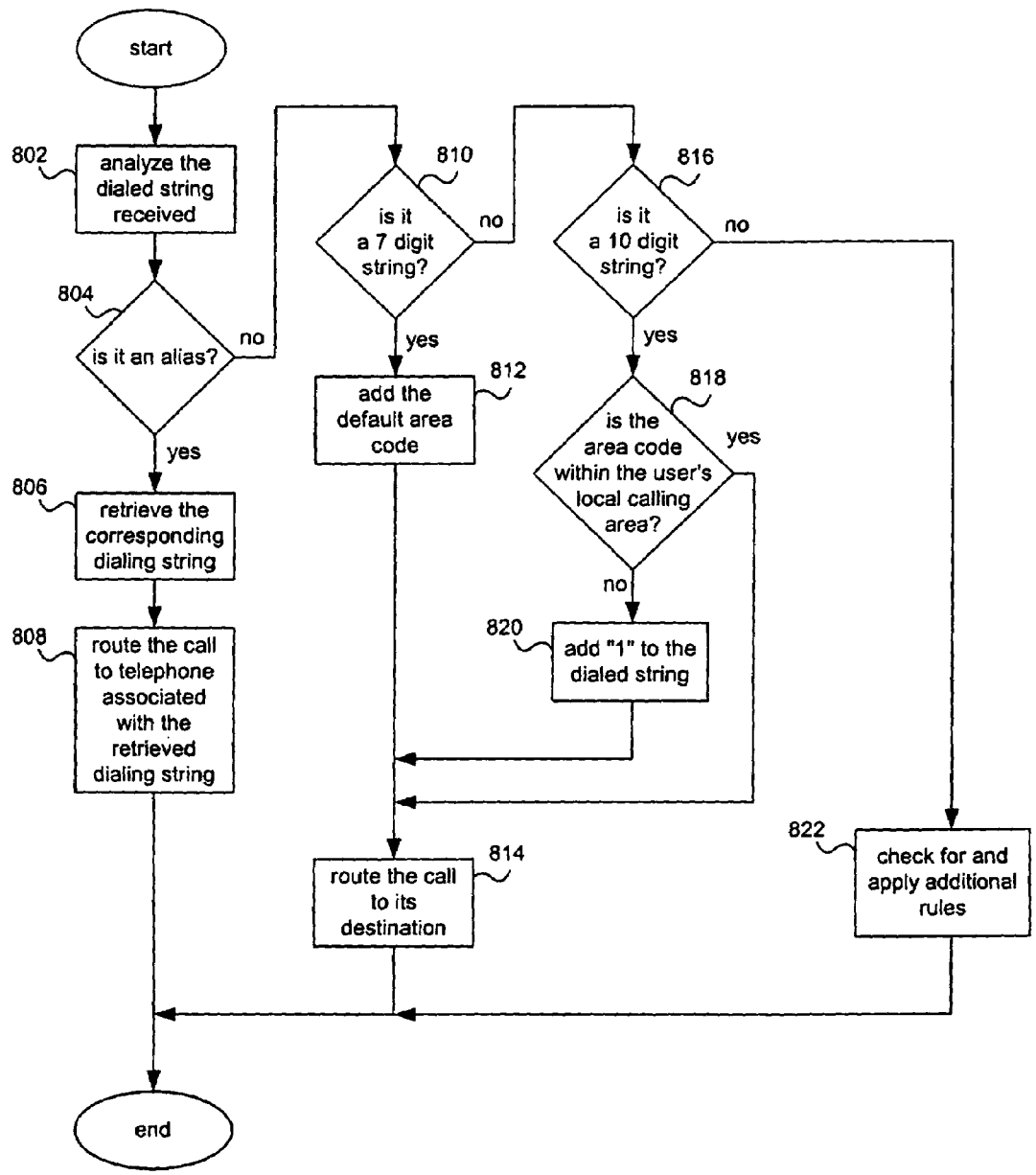
FIG. 8 is a flow diagram illustrating an exemplary method of operation of an exemplary system of the present invention.

FIG. 8 is a flow chart illustrating a process for applying dialing rules according to an embodiment of the present invention. In this exemplary embodiment, the local service provider's dialing plan requires ten digit dialing for all domestic calls, even for directory numbers included in the same area code or in the same local calling area as the user. The access code "1" is required for domestic long distance calls, but not for calls to other area codes that are within the user's local calling area. The dialed string is analyzed against dialing rules in the personal dialing plan, block 802. It is determined whether the dialed string is a defined alias for a complete string, block 804. If the dialed string is a defined alias, the server retrieves the corresponding complete dialing string, block 806, and the call is routed to the telephone associated with the complete dialing string, block 808.

If the dialed string is a seven digit string, block 810, the default area code (e.g., the user's own area code) is added, block 812, and the call is routed to its destination, block 814. If the dialed string is a ten digit string, block 816, the first three digits of the dialed string are analyzed to determine whether the area code of the dialed string is within the user's local calling area (i.e., not a long distance call), which may encompass one or more area codes, block 818. If the call is a local call, then the call is routed to its destination, block 814. If the call is outside the user's local calling area, then a "1" is added to the dialed string, block 820, and the call is routed to its destination, block 814. If the dialed string is not a seven or ten digit string or a recognized alias, the user's personal dialing plan rules are analyzed to see what other rules, if any, apply, block 822. If no other rules apply, the user receives an error message.

There is an interaction between the number of acceptable digits, whether a special personal dialing plan timer is activated, and whether an alias can be created where its digits are a subset of another alias. For example, if a special timer is enabled as part of the user's personal dialing plan, it is acceptable to use "123" and "1234" as unique aliases. However, if no timer is enabled, as soon as the personal dialing plan service recognized "123," the call would be routed to the directory number associated with the "123" alias. If the alias length is defined as a fixed number of digits, then this problem does not occur.

Any such problems can generally be solved with editing rules based on the current configuration of the user's personal dialing plan. For example, if the user has no timers enabled and no minimum alias length, the user is not allowed to enter a new alias that is a subset of an existing alias or vice versa. In other words, if "1234" is an existing alias, the user is not allowed to enter "123" as a new alias, and if "123" is an existing alias, the user is not allowed to enter "1234" as a new alias. This solution is complicated by the fact that the user is generally allowed to delete, add, or edit dialing rules or alias and dialing string entries at will. In this event, the user's personal dialing plan is reviewed following the establishment of any new rules or addition of any new alias entries to determine whether there are inconsistencies. Any inconsistencies are reported to the user, who has the opportunity to correct either the rules or the alias entries to eliminate the inconsistencies.

Typical user controls can be accessed via a voice telephone call (VoiceXML), web interface, or other device such as a WAP phone or PDA. Depending on the capabilities of the device used to access the personal dialing plan service, the service modification features available to the user may vary. Typically, users will be able to add, list for selection, delete a selection, or edit a selection for entries and dialing rules as discussed above. Users may also activate and deactivate the personal dialing plan service or either the rule-processing or alias/dialing string register component of the service.

For most users, their acquaintances can be identified by the last four digits of their acquaintances' directory numbers. However, entering the names and directory numbers of all of these people would be onerous for many users. To address this, all incoming calls and outgoing calls, depending upon the technology available for outbound calling, may be logged and a default register created, using the calling name supplied with the incoming and outgoing directory numbers. The creation of this directory could be based on a single default rule, such as creating a four-digit alias for each directory number based on the last four digits of the directory number.

Additionally, while the personal dialing plan service may typically be associated with a subscribed line, the user may be able to dial an access directory number from any telephone to access a server or IP that supports the user's personal dialing plan service. By entering identification and authorization information, the user can access the user's personal dialing plan, although not calling from a subscribed line or directory number associated with the personal dialing plan. For example, if the user has subscribed to the personal dialing plan service for his home telephone line, the user may want to access the user's plan when using a mobile phone. Thus, the user would dial an access directory number from the mobile phone, enter authorizing and identifying information, and then be able to access the user's personal dialing plan and make calls by dialing aliases, just as if the user was calling from his home telephone.

The foregoing description of the exemplary embodiments of the invention has been presented only for the purposes of illustration and description and is not intended to be exhaustive or to limit the invention to the precise forms disclosed. Many modifications and variations are possible in light of the above teaching. For example, the above described methods and systems are transferable to wireless and IP telephony networks and may be used in these networks along with the wireless equivalent of the AIN.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for processing a call, comprising:
   receiving a dialed digit string;
   analyzing the dialed digit string to determine whether the dialed digit string is a complete string according to a dialing plan of a service provider;
   if the dialed digit string is a complete string, then sending the call for routing to the dialed digit string;
   if the dialed digit string is not a complete string, then determining whether the dialed digit string is a valid string according to a calling party's personal dialing plan;
   if the dialed digit string is valid, then retrieving a number that corresponds to the dialed digit string according to the calling party's personal dialing plan; and
   sending the call for routing to the number.

2. A method according to claim 1, further comprising substituting the number for the dialed digit string.

3. A method according to claim 1, wherein retrieving the number comprises searching a register for an entry matching the dialed digit string.

4. A method according to claim 1, wherein retrieving the number comprises applying a rule to the dialed digit string whereby the dialed digit string is converted into a complete dialing string.

5. A method according to claim 1, further comprising associating the dialed digit string to the number.

6. A method according to claim 1, further comprising providing an option to define a time between an input of digits.

7. A method according to claim 1, further comprising prompting to add an entry to the calling party's personal dialing plan.

8. A method for creating a personal dialing plan of a calling party, comprising:
   receiving a request to add an entry to the calling party's personal dialing plan;
   receiving a complete dialing string recognizable by a service provider;
   receiving an alias; and
   associating the alias to the complete dialing string in the calling party's personal dialing plan.

9. A method according to claim 8, further comprising determining whether the alias is already assigned to another entry in the calling party's personal dialing plan.

10. A method according to claim 8, further comprising testing the alias.

11. A method according to claim 8, further comprising deleting an existing entry from the calling party's personal dialing plan.

12. A method according to claim 8, further comprising storing a rule associated with the calling party's personal dialing plan.

13. A method according to claim 12, further comprising receiving a code that identifies the rule.

* * * * *